United States Patent
Fletcher et al.

(10) Patent No.: US 9,109,712 B2
(45) Date of Patent: Aug. 18, 2015

(54) TAP WITH A LOCKING PIN

(76) Inventors: Craig Fletcher, Noosa Head (AU); Robert Fallshaw, Urangan (AU)

( * ) Notice: Subject to any disclaimer, the term of this patent is extended or adjusted under 35 U.S.C. 154(b) by 287 days.

(21) Appl. No.: 13/811,304

(22) PCT Filed: Aug. 1, 2011

(86) PCT No.: PCT/AU2011/000966
§ 371 (c)(1),
(2), (4) Date: Jan. 21, 2013

(87) PCT Pub. No.: WO2012/016274
PCT Pub. Date: Feb. 9, 2012

(65) Prior Publication Data
US 2013/0126767 A1     May 23, 2013

(30) Foreign Application Priority Data

Aug. 3, 2010   (AU) ................................. 2010100830
Dec. 14, 2010  (AU) ................................. 2010101410

(51) Int. Cl.
| | |
|---|---|
| *F16K 35/00* | (2006.01) |
| *F16K 35/02* | (2006.01) |
| *F16K 35/04* | (2006.01) |

(52) U.S. Cl.
CPC .................................... *F16K 35/025* (2013.01)

(58) Field of Classification Search
CPC ........ F16K 35/04; F16K 35/06; F16K 35/025
USPC .......................................... 251/104, 110, 288
See application file for complete search history.

(56) References Cited

U.S. PATENT DOCUMENTS

| | | | | | |
|---|---|---|---|---|---|
| 776,816 | A | * | 12/1904 | Tevendale, Jr. ............... | 251/110 |
| 1,602,270 | A | * | 10/1926 | Alexander ..................... | 251/104 |
| 1,669,305 | A | * | 5/1928 | Patierno ........................ | 251/110 |
| 1,758,727 | A | * | 5/1930 | Wildin .......................... | 251/104 |
| 2,081,464 | A | * | 5/1937 | Stewart ......................... | 137/385 |
| 2,158,574 | A | * | 5/1939 | Feiks ............................. | 251/104 |
| 2,328,446 | A | * | 8/1943 | Fuehrer .......................... | 74/528 |
| 2,965,354 | A | * | 12/1960 | Grove et al. ................... | 251/173 |
| 4,089,347 | A | * | 5/1978 | Christo ..................... | 137/625.41 |
| 4,274,445 | A | * | 6/1981 | Cooper ...................... | 137/636.1 |
| 5,860,446 | A |   | 1/1999 | Hunt | |

FOREIGN PATENT DOCUMENTS

| | | | | |
|---|---|---|---|---|
| CH | 683284 | A5 | 2/1994 | |
| EP | 1039193 | A2 * | 9/2000 | ............. F16K 35/02 |
| GB | 178274 | A | 4/1922 | |

* cited by examiner

*Primary Examiner* — John K Fristoe, Jr.
*Assistant Examiner* — Seth W MacKay-Smith
(74) *Attorney, Agent, or Firm* — David A. Guerra

(57) ABSTRACT

The present invention is directed to a tap handle assembly for positioning about an installed tap body that includes an outwardly extending spindle. The tap handle assembly has a handle body means that has a body aperture and engagement means for engaging an outer end of the spindle, a pin positionable and moveable within the body aperture, and a biasing means to bias the position of the pin within the body aperture. When the tap handle assembly is assembled with the tap body, the pin is biased to the tap body to substantially prevent the movement of the spindle and to restrict the flow from the tap.

20 Claims, 4 Drawing Sheets

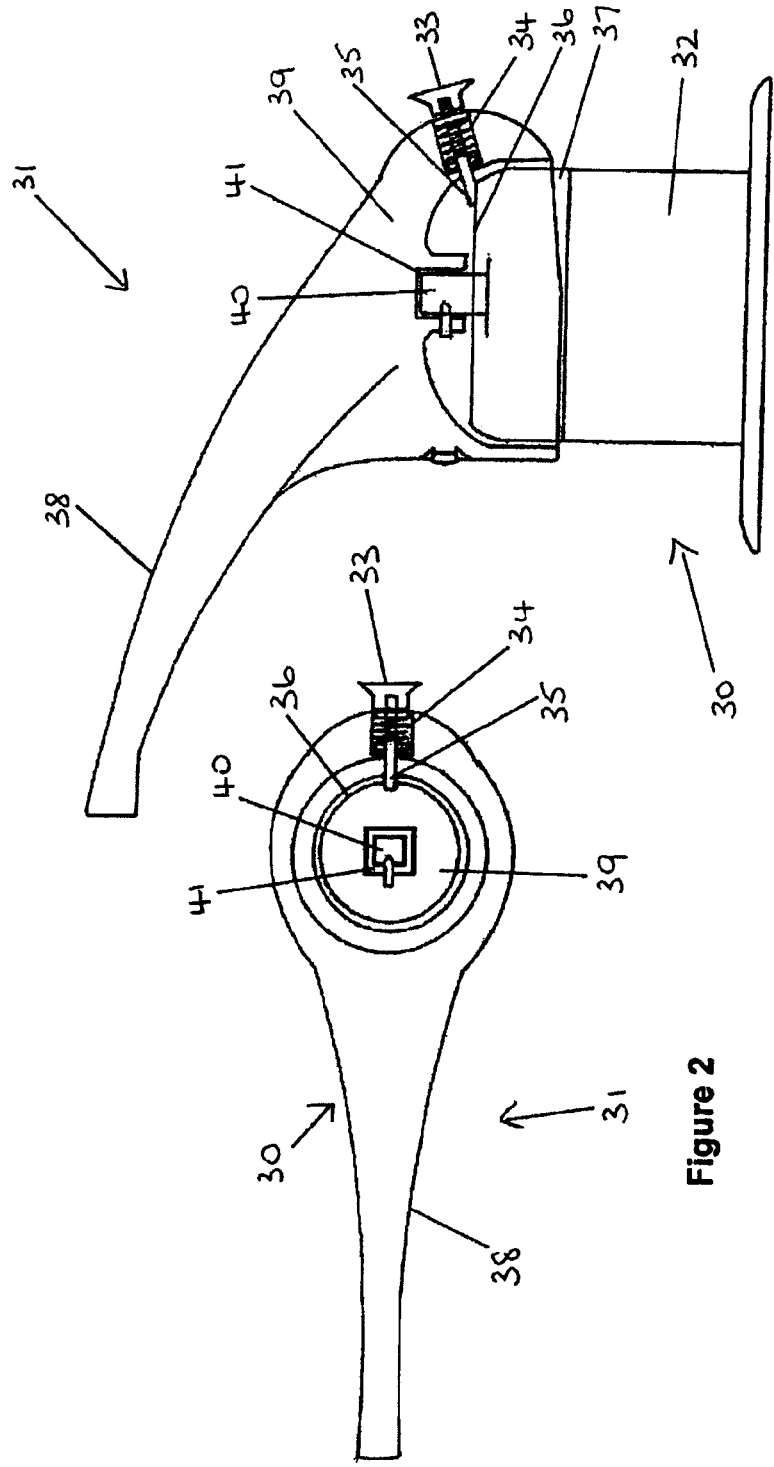

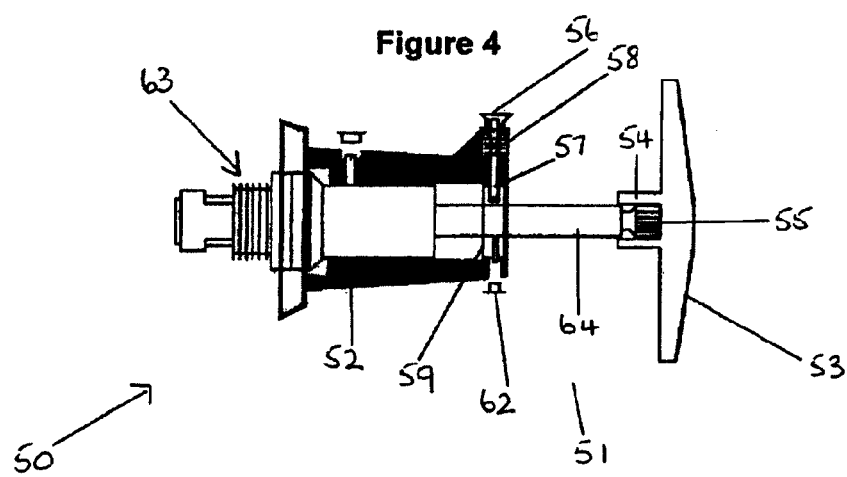
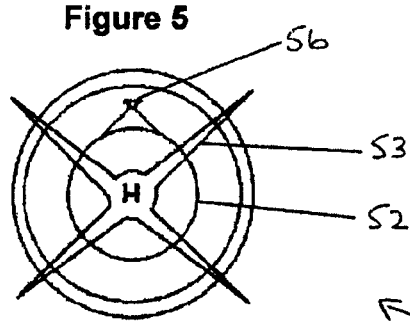
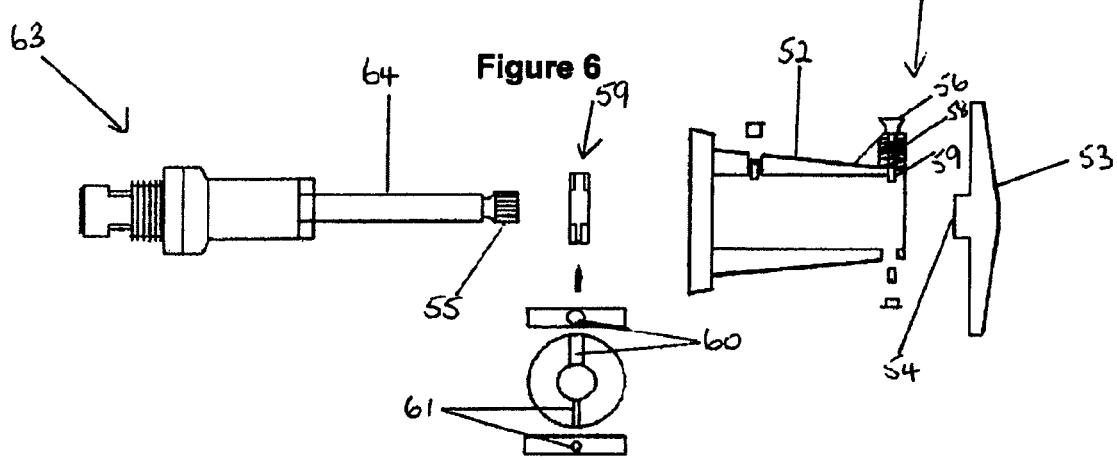

TAP WITH A LOCKING PIN

CROSS-REFERENCE TO RELATED APPLICATIONS

This application is an U.S. national phase application under 35 U.S.C. §371 based upon co-pending International Application No. PCT/AU2011/000966 filed on Aug. 1, 2011. Additionally, this U.S. national phase application claims the benefit of priority of co-pending International Application No. PCT/AU2011/000966 filed on Aug. 1, 2011, Australia Application No. 2010100830 filed on Aug. 3, 2010 and Australia Application No. 201010410 filed on Dec. 14, 2010. The entire disclosures of the prior applications are incorporated herein by reference. The international application was published on Feb. 9, 2012 under Publication No. WO 2012/016274 A1.

FIELD OF INVENTION

The present invention relates to water taps and faucets having a locking mechanism. The present invention has particular but not exclusive application to domestic water taps and faucets. Reference will now be made to domestic water taps and faucets but this is by way of example only and the invention is not limited to this example.

BACKGROUND OF THE INVENTION

Domestic water taps can pose a serious safety risk to children and the elderly. Children can receive serious scalds as a result of playing with hot water taps in baths, sinks or showers. Furthermore, children playing with water taps can cause water wastage or flooding. As well in baths, there is an increased risk of drowning where there is an opportunity for children to turn on a tap. Similarly, the elderly and infirm may accidentally scald themselves or cause flooding in situations where they are unfamiliar with the tap operation or have difficulty operating a tap.

OBJECT OF THE INVENTION

It is an object of the present invention to provide a tap assembly which overcomes at least in part one or more of the above mentioned disadvantages.

SUMMARY OF THE INVENTION

The present invention broadly resides in a tap handle assembly for positioning about an installed tap body that includes an outwardly extending spindle; including
a handle body means that has a body aperture and engagement means for engaging an outer end of the spindle;
a pin positionable and moveable within the body aperture;
a biasing means to bias the position of the pin within the body aperture;
wherein when assembled the pin is biased to the tap body to substantially prevent the movement of the spindle and to restrict the flow from the tap.

The tap handle assembly is preferably used with a quarter turn lever-type faucet; a rotary tap; or a mixer tap, such as a flick mixer tap.

The handle body means includes a tap handle portion integral with or operatively associated therewith a tap housing portion. In one embodiment the tap handle portion and tap housing portion are separate and the tap handle portion is engageable with the outer end of the spindle while the tap housing portion has the body aperture. This embodiment is preferably used with rotary type taps.

In an alternate embodiment, the tap handle portion and tap housing portion are integral and the tap housing portion is engageable with the outer end of the spindle and has the body aperture. This embodiment is preferably used with quarter turn lever-type faucets and mixer type taps.

The engagement means of the handle body means is preferably by a screw threaded fastener such as a grub screw and or by friction fitting with male-female complementary shaped parts.

The engagement means of the handle body means may be located in the tap handle portion or in the tap housing portion.

The body aperture may be located in the tap handle portion or in the tap housing portion.

The body aperture preferably has a diameter that narrows between an outside surface to an inside surface of the handle body means. More preferably the body aperture has an internal peripheral ridge thereby reducing the diameter of the aperture proximal to the inside surface of the handle body means. The pin preferably has an enlarged end to provide grip for an operator and an outwardly extending flange to prevent the pin from passing through the body aperture. The pin has a stem portion. The stem portion preferably has an outwardly extending flange part way along the stem portion to abut the internal peripheral ridge within the body aperture of the handle body means.

The biasing means is preferably a spring. More preferably the biasing means is a helical spring. Preferably the helical spring is positioned around the stem portion of the pin between the knob and the outwardly extending flange. Preferably the stem portion and the spring are held by a retaining nut with the knob positioned on the outside of the handle body means. Preferably the retaining nut is threaded and is fastened to the handle body means by a complementary screw thread on an internal peripheral surface of the aperture. The spring is preferably retained on the pin by the outwardly extending flange, and the outwardly extending flange is preferably retained within the body aperture by abutting the internal peripheral ridge within the body aperture.

The free end of the stem portion of the pin may engage by any suitable means to substantially restrict the movement of the tap body.

In one embodiment, the free end of the stem portion can abut a surface of the tap body. In an alternate embodiment, the free end portion of the pin can engage a hole or slot in the tap body. The hole or slot is preferably located in the spindle, a collar or sleeve operatively associated with the spindle or housing operatively associated with and surrounding the spindle.

Preferably the pin is disengaged by pulling on the knob portion, thus compressing the spring between the retaining nut and the outwardly extending flange. Preferably after the pin is disengaged, the pin will not restrict movement and will allow free movement of the tap handle portion and spindle until the tap handle is returned to the closed position when the end portion will re-engage to substantially restrict further movement.

In one embodiment the biasing force necessary to disengage the pin is of sufficient magnitude to prevent a tap being turned on by a child, elderly or infirm.

The present invention in another aspect provides a tap handle assembly for positioning about an installed flick mixer tap body that includes an outwardly extending spindle; including
a handle body means that has a body aperture and engagement means for engaging an outer end of the spindle, said handle body means has an integral tap handle portion and tap housing portion, said tap housing portion has the body aperture and a complementary shaped part for engaging an outer end of the spindle;

a pin positionable and moveable within the body aperture;

a biasing means to bias the position of the pin within the body aperture;

wherein when assembled the pin is biased to a cap portion of the tap body to substantially prevent the movement of the spindle in an outward direction and thus restrict the flow from the tap.

Preferably the pin abuts the cap portion when engaged and prevents the movement of the spindle in an outward direction to restrict the flow of water from the tap. Preferably the pin engages with the cap portion by contacting a lip edge of the cap portion of the tap body to prevent the tap being opened by moving a flick handle in an outward direction. The cap portion may have a locating recess or aperture for positioning of the pin.

In another aspect the present invention resides in a tap handle assembly for positioning about an installed quarter turn tap body that includes an outwardly extending spindle; including a handle body means that has a body aperture and engagement means for engaging an outer end of the spindle, said handle body means has an integral tap handle portion and tap housing portion, said tap housing portion has the body aperture and a complementary shaped part for engaging an outer end of the spindle;

a pin positionable and moveable within the body aperture;

a biasing means to bias the position of the pin within the body aperture;

wherein when assembled the pin is biased to the spindle to substantially prevent the movement of the spindle and to restrict the flow from the tap.

In a further aspect the present invention resides in a tap handle assembly for positioning about an installed tap body for a rotary type tap that includes an outwardly extending spindle; including a handle body means that has a body aperture and engagement means for engaging an outer end of the spindle, said handle body means has a separate tap handle portion and separate tap housing portion, said tap housing portion has the body aperture and the tap handle portion has a complementary shaped part for engaging an outer end of the spindle;

a pin positionable and moveable within the body aperture;

a biasing means to bias the position of the pin within the body aperture;

wherein when assembled the pin is biased to the spindle to substantially prevent the movement of the spindle and to restrict the flow from the tap.

In this aspect the pin preferably engages with a hole in the spindle or a collar attached to the spindle. The collar surrounding the spindle is preferably fixable and repositionable along the length of the spindle shaft to allow for variation in the distance from a wall during the installation of the tap assembly. Preferably when the collar has been fixed in position, the pin can engage with the aperture to prevent movement of the spindle shaft and tap handle.

The taps with the locking pin can be used to control the flow of water, gas or some other suitable medium.

BRIEF DESCRIPTION OF THE DRAWINGS

In order that the present invention can be more readily understood reference will now be made to the accompanying drawings which illustrate a preferred embodiment of the invention and wherein:

FIG. 2 is a plan view of a flick mixer tap incorporating a biased pin lock;

FIG. 3 is a diagrammatic cross sectional view of the flick mixer tap of FIG. 2;

FIG. 4 is a diagrammatic cross sectional view of an alternate embodiment of a rotary tap incorporating a biased pin lock;

FIG. 5 is a plan view of the rotary tap of FIG. 4;

FIG. 6 is an exploded view of the rotary tap of FIG. 4;

DETAILED DESCRIPTION OF THE PREFERRED EMBODIMENT

Figure 1:
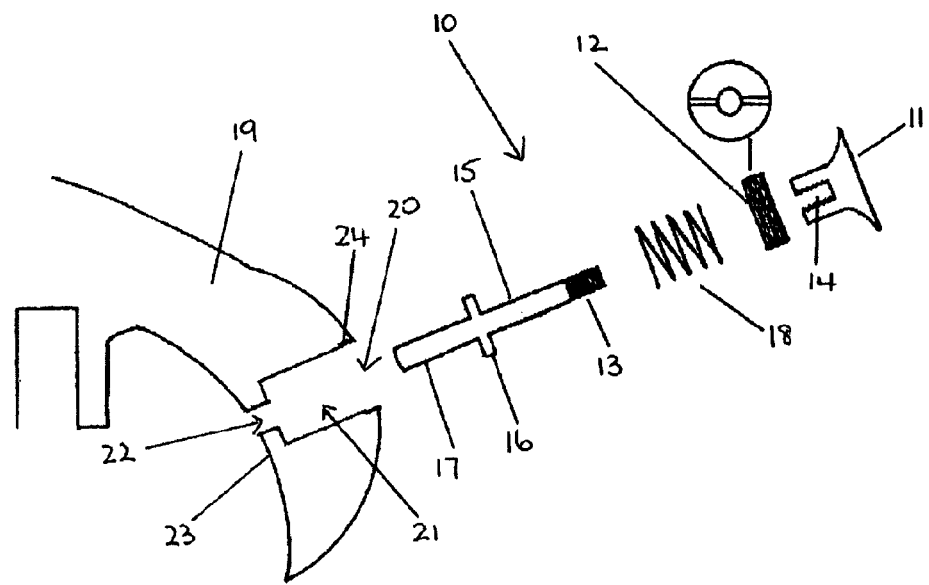
FIG. 1 is an exploded view of a biased pin lock.

With reference to FIG. 1 there is shown a biased locking pin 10 for a tap handle assembly for a flick mixer tap. The locking pin 10 has a knob 11, a stem portion 15, an outwardly extending flange 16 and an end portion 17. The knob 11 has a threaded recess 14 and is connected to the stem portion 15 by screw attachment to a threaded end 13. A helical spring 18 is mounted on the stem portion 15 between the outwardly extending flange 16 and the knob 11. A threaded retaining ring 12 is mounted on the stem portion 15 between the helical spring 18 and the knob 11. The stem portion 15, outwardly extending flange 17 and helical spring 18 are retained in a wide aperture section 21 in a tap handle body 19 by the threaded retaining ring 12 to a threaded periphery 24 of a body aperture 20. The wide aperture section 21 is adjacent a narrow aperture section 22. The pin end 17 protrudes through the aperture 20 where it engages to prevent movement of the tap handle body 19 and a spindle portion (not shown) and stop the flow of water. The pin end 17 of the locking pin 10 is disengaged by pulling on the knob portion 11, thus compressing the spring 18 between the retaining nut 12 and the outwardly extending flange 16 to allow free movement of the tap handle body 19 and spindle portion (not shown).

With reference to FIGS. 2 and 3 there is shown a flick mixer tap handle assembly 30. The flick mixer tap assembly 30 has a tap handle body 31 in connection with an outwardly extending spindle portion 40 of a tap body 32. The tap handle body 31 has a flick handle portion 38 and a tap housing portion 39. The spindle 40 is attached to a recess 41 in the tap housing portion 39. Upward movement of the flick handle 38 moves the spindle portion 40 upwards to open the tap and allow water to flow. The tap body 32 has a cap portion 37 with a lip 36. The tap handle body 31 has a body aperture 34 housing a locking pin 33. The locking pin 33 has an end portion 35. When the tap is in the closed position, the end portion 35 of the locking pin 33 abuts the lip 36 of the cap portion 37 to prevent the tap being opened by the upward movement of the flick handle 38. The end portion 35 of the locking pin 33 is disengaged from the lip 36 by pulling on the locking pin 33, allowing free movement of the spindle 40 and the tap handle body 31. When disengaged, the end portion 35 of the locking pin 33 is free to move against the cap portion 37 and does not further restrict the movement of the tap handle and spindle until the tap handle body 31 is returned to the closed position when the end portion 35 will re-engage with the lip 36.

With reference to FIGS. 4, 5 and 6 there is shown a rotary tap handle assembly 50. The rotary tap assembly 50 has a handle body 51 comprising a tap handle portion 53 and a tap housing portion 52. The tap housing portion 52 accommodates a tap body 63 having a spindle 64. The spindle 64 has an outer spindle end 55 which is connected to a recess 54 in the tap handle portion 53. The spindle 64 passes through a collar 59 within the tap housing portion 52. The collar 59 is moveable along the spindle 64 to allow for variations occurring during installation of the tap. The collar 59 is positioned, aligned and secured to the spindle 64 by a grub screw 62 through an aperture 61 in the collar 59. The tap housing portion 52 has an aperture 58 for a locking pin 56. The locking pin 56 has an end portion 57. When the tap handle 53 is in the closed position, the end portion 57 of the locking pin 56 engages with a second aperture 60 in the collar 59 to lock the spindle 64 and prevent rotation of the tap handle 53. The end portion 57 of the locking pin 56 is disengaged from the aperture 60 by pulling on the locking pin 56, allowing free movement of the spindle 64 and the tap handle 53. Once disengaged, the end portion 57 of the locking pin 56 is free to move against the circumference of the collar 59 and does not further restrict the movement of the tap handle 53 and spindle 64 until the tap handle 53 is returned to the closed position when the end portion 57 will re-engage with the aperture 60 in the collar 59.

Figure 7:
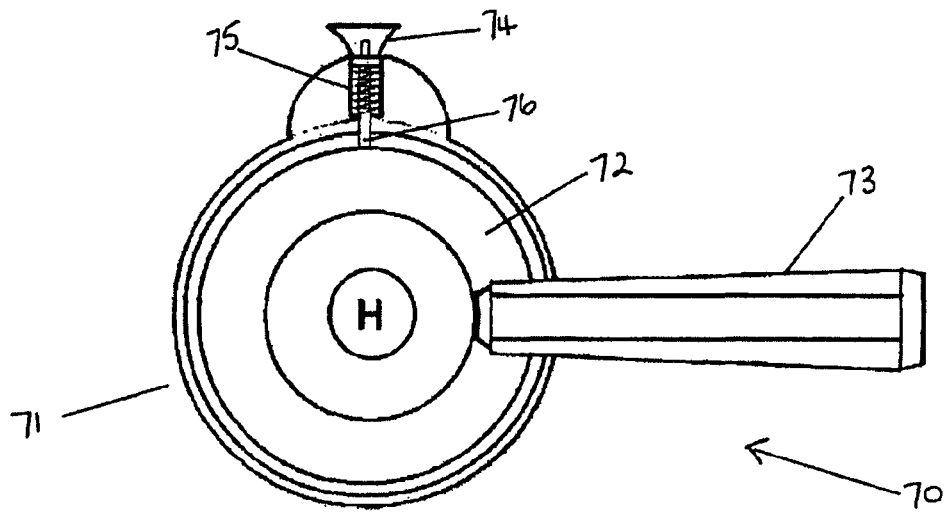
FIG. 7 is a plan view of an alternate embodiment of a quarter turn lever tap incorporating a biased pin lock.
Figure 9:
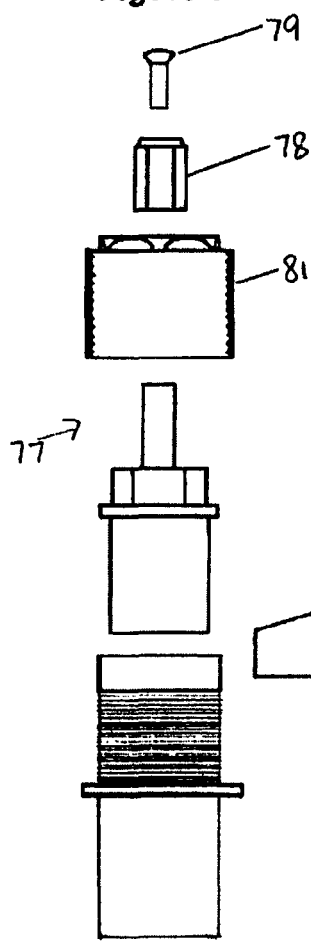
FIG. 9 is an exploded view of the tap body of the quarter turn lever tap of FIG. 7.
Figure 8:
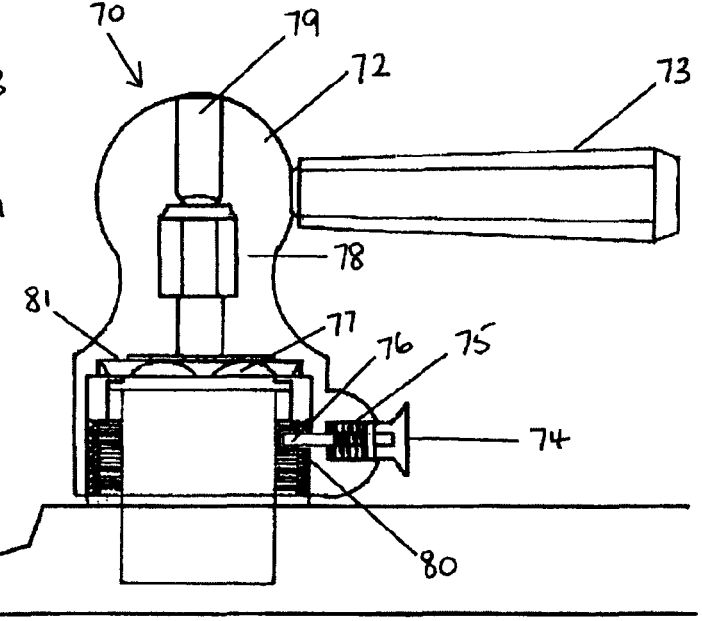
FIG. 8 is a diagrammatic cross sectional view of the quarter turn lever tap of FIG. 7.

With reference to FIGS. 7, 8 and 9 there is shown a quarter turn lever tap handle assembly 70. The quarter turn lever tap assembly 70 has a handle body 71 comprising a tap handle portion 73 and a tap housing portion 72. The tap housing portion 72 accommodates a tap body 77 having a spindle portion 81. The spindle portion 81 has a spindle end 78 which is secured to the tap housing portion 72 by a screw 79. The tap housing portion 72 has an aperture 75 housing a locking pin 74. The locking pin 74 has an end portion 76. When the tap handle 73 is in the closed position, the end portion 76 of the locking pin 74 engages with an aperture 80 in the spindle portion 81 to prevent rotation of the tap handle 73. The end portion 76 of the locking pin 74 is disengaged from the aperture 80 by pulling on the locking pin 74, allowing free movement of the spindle portion 81 and the tap handle 73. Once disengaged, the end portion 76 of the locking pin 74 is free to move against the external surface of the spindle portion 81 and does not further restrict the movement of the tap handle 73 and spindle portion 81 until the tap handle 73 is returned to the closed position when the end portion 76 of the locking pin 74 will re-engage with the aperture 80 in the spindle portion 81.

Advantages

An advantage of the preferred embodiment of the tap assembly is the provision of a tap that cannot be turned on accidently.

The biasing force required to disengage the locking pin is of sufficient magnitude such that the tap cannot be turned on by a child. The tap assembly can therefore protect against accidental scalding from water from a hot tap. The tap assembly can also protect against flooding and drowning situations, as well as preventing against water wastage.

The biasing force necessary to disengage the locking pin is also of sufficient magnitude to prevent a tap being turned on by the elderly or infirm. Taps having the biased pin lock are therefore useful in aged care establishments.

Variations

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A tap handle assembly for positioning about an installed tap body that includes an outwardly extending spindle, said tap handle comprising:
    a handle body having a tap handle portion, a tap housing portion, and a complementary shaped part for engaging an outer end of said spindle by way of an engagement element, said tap housing portion defining a tap body recess configured to accommodate a portion of said tap body and a portion of said spindle, said tap housing portion further defining a body aperture therethrough in communication with said tap body recess;
    a pin positionable and moveable within said body aperture; and
    a biasing element to bias a position of said pin within said body aperture;
    wherein when assembled said pin is biased to said tap body to substantially prevent movement of said spindle and to restrict flow from said tap body.

2. The tap handle assembly as claimed in claim 1, wherein said tap handle portion is one of integral with, and operatively associated therewith said tap housing portion.

3. The tap handle assembly as claimed in claim 1, wherein said tap handle portion and said tap housing portion are separate and said tap handle portion is engageable with said outer end of said spindle while said tap housing portion has said body aperture.

4. The tap handle assembly as claimed in claim 1, wherein said tap handle portion and said tap housing portion are integral and said tap housing portion is engageable with said outer end of the spindle and has said body aperture.

5. The tap handle assembly as claimed in claim 1, wherein said engagement element is a screw threaded fastener.

6. The tap handle assembly as claimed in claim 5, wherein said screw threaded fastener is selected from the group consisting of a grub screw, and by friction fitting with male-female complementary shaped parts.

7. The tap handle assembly as claimed in claim 1, wherein said engagement element is located in one of said tap handle portion, and in said tap housing portion.

8. The tap handle assembly as claimed in claim 1, wherein said body aperture has a diameter that narrows between an outside surface to an inside surface of said handle body.

9. The tap handle assembly as claimed in claim 1, wherein said pin has an enlarged end to provide grip for an operator and an outwardly extending flange to prevent said pin from passing through said body aperture.

10. The tap handle assembly as claimed in claim 8, wherein said body aperture has an internal peripheral ridge thereby reducing said diameter of said body aperture proximal to said inside surface of said handle body.

11. The tap handle assembly as claimed in claim 10, wherein said pin has a stem portion including a portion receivable through a narrow aperture section defined by said internal peripheral ridge, said narrow aperture section is in communication with said body aperture, said stem portion has an outwardly extending flange part way along said stem portion to abut said internal peripheral ridge within said body aperture of said handle body.

12. The tap handle assembly as claimed in claim 11, wherein said biasing element is a helical spring positioned around said stem portion of said pin between a knob of said pin and said outwardly extending flange, said stem portion and said spring are held by a retaining nut with said knob positioned on an outside of said handle body.

13. The tap handle assembly as claimed in claim 12, wherein said pin is disengaged by pulling on said knob, thus compressing said spring between said retaining nut and said outwardly extending flange, wherein when said pin is disengaged, said pin will allow free movement of said tap handle portion and said spindle until said tap handle is returned to a closed position when an end portion of said pin will re-engage to substantially restrict further movement.

14. The tap handle assembly as claimed in claim 11, wherein said retaining nut is threaded and is fastened to said handle body by a complementary screw thread on an internal peripheral surface of said body aperture.

15. The tap handle assembly as claimed in claim 11, wherein said biasing element is a spring that is retained on said pin by said outwardly extending flange, and said outwardly extending flange is retained within said body aperture by abutting said internal peripheral ridge within said body aperture.

16. The tap handle assembly as claimed in claim 11, wherein a free end of said pin engages an area of said tap body selected from the group consisting of a free end surface, and a lip, a hole defined in said tap body, and a slot defined in said tap body.

17. The tap handle assembly as claimed in claim 11, wherein a free end of said pin engages a hole or slot defined in said tap body, said hole or slot is located in one of said spindle, a collar, and a sleeve, said collar and sleeve being operatively associated with one of said spindle, and a housing operatively associated with and surrounding said spindle.

18. The tap handle assembly as claimed in claim 1, wherein said tap body is selected from the group consisting of a single lever mixer tap, and a quarter turn tap body, wherein said tap body recess and said engagement element are configured for engaging said outer end of said spindle, and wherein said pin engages with a cap portion of said tap body by contacting a lip edge of said cap portion to prevent said tap body being opened by moving a lever handle in an outward direction, said cap portion has one of a locating recess, and an aperture for positioning of said pin.

19. The tap handle assembly as claimed in claim 1, wherein said tap body is a rotary tap, said tap handle portion is separate from said tap housing portion.

20. The tap handle assembly as claimed in claim 19, wherein said pin engages with one of a hole defined in said spindle, and a hole defined in a collar attached to said spindle with said collar surrounding said spindle and is fixable and repositionable along a length of a spindle shaft to allow for variation in a distance from a wall during installation of said tap handle assembly.

\* \* \* \* \*